(No Model.)
H. W. FAYETTE.
OIL INJECTOR FOR BOILERS.
No. 571,350. Patented Nov. 17, 1896.
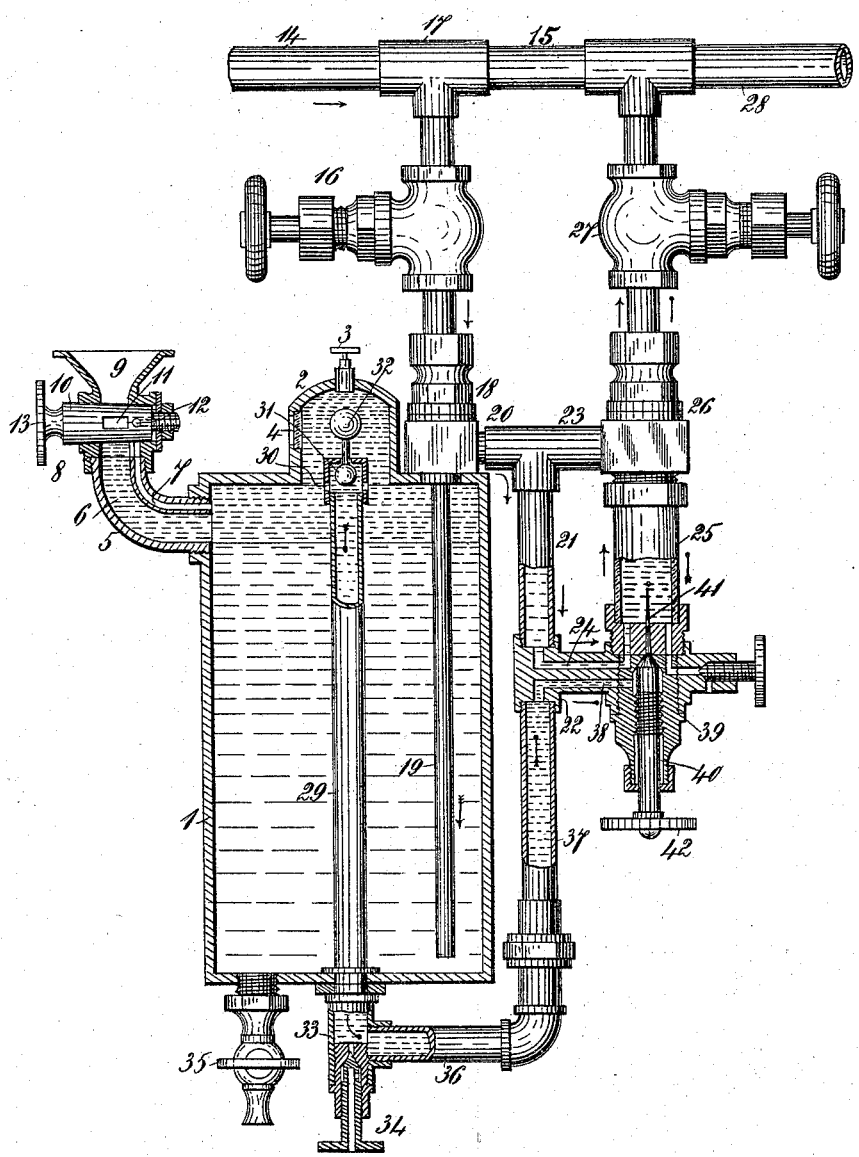
Witnesses:
John Buckler,
F. H. Pierce.
Inventor:
Henry W. Fayette,
By A. M. Pierce.
Attorney.

UNITED STATES PATENT OFFICE.

HENRY W. FAYETTE, OF NEW YORK, N. Y., ASSIGNOR TO ARTHUR M. PIERCE, OF SAME PLACE.

OIL-INJECTOR FOR BOILERS.

SPECIFICATION forming part of Letters Patent No. 571,350, dated November 17, 1896.

Application filed September 15, 1894. Renewed May 7, 1896. Serial No. 590,631. (No model.)

*To all whom it may concern:*

Be it known that I, HENRY W. FAYETTE, a citizen of the United States, residing in the city, county, and State of New York, have invented a new and useful Improvement in Oil-Injectors for Boilers, of which the following is a specification.

My invention relates especially to devices employed with steam-boilers to remove and prevent incrustation and keep the boiler clean and free from deposits of whatsoever nature, and has for its object the provision of a simple, cheap, and effective device whereby hydrocarbon oil or other equivalent may be supplied in a regular and automatic manner to the feed-water, said oil being carried into the boiler in just such a quantity as to keep the same clean and free from scales, &c.

To attain the desired end, my invention consists, essentially, in certain novel and useful combinations or arrangements of parts and peculiarities of construction and operation, all of which will be hereinafter first fully described, and then pointed out in the claims.

In the accompanying drawing, forming a part hereof, is shown a vertical sectional view of a device embodying my invention.

1 is an oil-supply tank, made of any approved material and any desired size and shape. Mounted upon the top of the tank 1 is a dome 2, having an air-vent 3 and a glazed opening 4 therein. For convenience I have shown the glazed opening 4 as located on the side of the device, but it may be placed in the front or at any other desired point.

At the side of the tank 1 is an oil-filler, consisting of a pipe or elbow 5, provided with an oil-passage 6 and an air-vent passage 7. Upon the pipe 5 is mounted a shell 8, having a funnel-shaped receiver 9. Passing through the shell 8 is a valve-stem 10, provided with an opening 11 therethrough corresponding to the passage 6, and a second opening 12, entering the axis of the stem and opening opposite to the air-vent passage 7. The stem 10 is provided with a manipulating button or wheel 13.

In the drawing the device is shown as full of oil to the continuous horizontal line in the tank 1, the space below said line being occupied by water, and the supply-passage and air-vent are closed. In filling the device the valve-stem is turned at right angles to its present position, and as the oil is poured into the funnel 9 the air will escape from the tank 1 through the passage 7.

14 is a pipe leading from the feed-water supply, and 15 is a continuation thereof to the boiler-supply.

16 is a regulating-valve, connected to the pipes 14 and 15 by a T 17 and also to a chamber 18. From this chamber 18 extends a downwardly-projecting pipe 19 into the tank 1, and a pipe 20 21 to a T 22.

23 is a branch pipe leading to the boiler connections.

24 is a passage through the piece 22, leading to a sight-glass 25, fixed to the outer extremity of the T 22. The sight-glass has a connection 26 to a valve 27, communicating with a pipe 28, leading to the boiler.

Fixed in the center of the tank 1, beneath the dome 2, is a pipe 29, having at its upper end a perforated cap 30, wherein is a ball-valve 31, controlled by a float 32. Beneath the tank 1 the pipe 29 is connected to a T 33, provided with an oil-drain cock 34.

35 is a cock for draining the water from the tank 1 when desired.

36 37 is a pipe leading from the T 33 to the T 22, wherein is a passage 38, leading to a chamber 39 beneath the sight-glass 25. Directly below said sight-glass is placed a valve-stem 40, which passes through the chamber 39 and bears a needle 41, which projects into the sight-glass.

42 is a manipulating wheel or button mounted upon the valve-stem 40, and 43 is a cock for draining the sight glass.

For convenience in illustrating the operation of my device I have indicated in the drawing the flow of water by sharp-headed arrows and the flow of oil by round-headed arrows.

When attached to the water-feed of a boiler and filled for use, the operation of my device is as follows: The pressure of the water within the tank 1 forces the oil through the pipes 29, 30, and 37 to the chamber 39. By slightly retracting the valve-stem 40 the oil will escape from said chamber, passing up the needle 41 in single drops into the water in the sight-glass 25, said sight-glass forming a commingling-chamber. The water which passes into the tank 1 through the pipe 19 is simply to force the oil therefrom and take its place as it passes out, but this water does not escape with the oil, the main flow of water being through the pipes 14, 15, and 28, and also through pipes 20, 21, and 23, and through the sight-glass, and this circulation takes up the drops of oil as they pass from the needle, the amount of oil passing being readily seen through the glass. This circulation of water through the sight-glass keeps said glass clean and free from deposits. It will thus be seen that the oil is thoroughly dispursed through the water, and the amount supplied may be accurately regulated. By the peculiar arrangement of the oil-feed valve within the chamber or tank 1 all danger of fire in case the sight-glass should be accidentally broken is obviated, for upon the breaking of said glass the pressure within the oil-tube 29 and the parts connecting it with the sight-glass would be removed and the ball 31 would fall, effectually preventing the escape of the oil from the tank 1.

Having now fully described my invention, what I claim as new therein, and desire to secure by Letters Patent, is—

1. In a device of the character herein specified, an oil-tank; an automatic valve therein for controlling the escape of oil; a pipe entering said tank and communicating with the feed-water supply; a sight-glass having independent connections with the oil supply and the feed-water supply, and means for regulating the flow of oil into the sight-glass, the whole combined, and arranged to operate, substantially as shown and described.

2. In a device of the character herein specified, the combination with the oil and water commingling-chamber formed by the sight-glass, of independent oil and feed-water connections, arranged substantially as shown and described.

3. In a device of the character herein specified, the combination with a sight-glass forming a commingling-chamber, and provided with means for causing water to circulate therethrough, of an oil-regulating valve, in which is comprised a valve-shell, and a valve-stem provided with a needle-point projecting up into the commingling-chamber, substantially as shown and described.

4. The combination with the commingling-chamber, of the circulating feed-water supply thereto, and the oil supply, arranged substantially as shown and described.

5. In a device of the character herein specified, the combination with the sight-glass, and the oil-supply tube connected therewith, of an automatic controlling-valve at the entrance to the oil-supply tube, substantially as shown and described.

HENRY W. FAYETTE.

Witnesses:
A. M. PIERCE,
F. H. PIERCE.